United States Patent
Kubicek et al.

[15] 3,670,043
[45] June 13, 1972

[54] OLEFIN CONVERSION PROCESS USING COMPLEXES OF TI, ZR AND HF WITH ORGANOALUMINUM AS OLEFIN REACTION CATALYSTS

[72] Inventors: Donald H. Kubicek; Ernest A. Zuech, both of c/o Phillips Petroleum Co., Bartlesville, Okla. 74003

[22] Filed: March 23, 1970

[21] Appl. No.: 22,096

Related U.S. Application Data

[60] Division of Ser. No. 717,027, March 28, 1968, abandoned, which is a continuation-in-part of Ser. No. 635,657, May 3, 1967, abandoned.

[52] U.S. Cl..................260/683 D, 260/94.9 B, 260/651 R, 260/658 R, 260/666 A, 260/677 R, 260/680 R, 260/683.15 D, 252/429 B, 252/431 C, 252/431, 252/431 N, 252/431 P
[51] Int. Cl..........................................................C07c 3/62
[58] Field of Search............260/683 D, 683.15, 666 A, 680, 260/677

[56] References Cited

UNITED STATES PATENTS

| | | | |
|---|---|---|---|
| 3,379,706 | 4/1968 | Wilke | 252/431 |
| 3,152,088 | 10/1964 | Sandri et al. | 252/429 |
| 2,827,446 | 3/1958 | Breslow | 260/94.9 |
| 2,940,964 | 6/1960 | Mastardini et al. | 260/94.9 |
| 3,206,448 | 9/1965 | Naylor | 260/94.3 |
| 3,081,287 | 3/1963 | Coover et al. | 260/93.7 |
| 3,446,871 | 5/1969 | Maxfield | 260/683.15 |
| 3,219,651 | 11/1965 | Hill et al. | 260/94.9 |
| 3,306,919 | 2/1967 | Brantley et al. | 260/429.5 |
| 3,113,115 | 12/1963 | Ziegler et al. | 252/429 |
| 3,139,418 | 6/1964 | Marullo et al. | 252/429 |

*Primary Examiner*—Delbert E. Gantz
*Assistant Examiner*—C. E. Spresser
*Attorney*—Young and Quigg

[57] ABSTRACT

Olefins are converted into other olefins having different numbers of carbon atoms by contact with a homogenous catalyst active for disproportionating an olefin into other olefins of both higher and lower carbon atoms comprising a coordination complex of zirconium, titanium or hafnium together with an aluminum-containing catalytic adjuvant.

12 Claims, No Drawings

OLEFIN CONVERSION PROCESS USING COMPLEXES OF TI, ZR AND HF WITH ORGANOALUMINUM AS OLEFIN REACTION CATALYSTS

This application is a divisional of copending application Ser. No. 717,027, filed Mar. 28, 1968, now abandoned which is a continuation-in-part of copending application Ser. No. 635,657, filed May 3, 1967, now abandoned.

This invention relates to the conversion of hydrocarbons and to a homogeneous catalyst for such conversion. In one aspect this invention relates to the olefin reaction. In another aspect it relates to the conversion of olefins to other olefins having different molecular weights according to the olefin reaction. In still another aspect it relates to a novel homogeneous, multicomponent catalyst.

The term "olefin reaction", as used herein, is defined as a process for the catalytic conversion in the presence of a catalyst of a feed comprising one or more ethylenically unsaturated compounds to produce a resulting product which contains at least 10 percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than 25 percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms, respectively, and the formation of two new unsaturated bonds. Said first and second carbon atoms and said third and fourth carbon atoms can be in the same or different molecules.

The olefin reaction according to this invention is illustrated by the following reactions:

1. The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

2. The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

3. The conversion of ethylene and an internal acyclic mono- or polyene having four or more carbon atoms to produce other olefins having a lower number of carbon atoms than that of the acyclic mono- or polyene; for example, the conversion of ethylene and 4-methylpentene-2 yields 3-methylbutene-1 and propylene;

4. The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

5. The conversion of one or more cyclic mono- or cyclic polyenes to produce a cyclic polyene having a higher number of carbon atoms than any of the starting materials; for example, the conversion of cyclopentene yields 1,6-cyclodecadiene and continued reaction can give higher molecular weight materials.

6. The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or 7. The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

New catalytic processes have been discovered, in recent years, for the conversion of olefins to other olefinic products including products of both higher and lower molecular weight whereby olefins of relatively low value are converted to olefins of increased value. Such conversions have been carried out with heterogeneous catalysts such as those comprising compounds of metals such as molybdenum or tungsten which are usually associated with solid support materials such as alumina or silica. It has now been found that these olefin conversions can be carried out in a substantially homogeneous state using, as catalysts, selected coordination complexes of zirconium, titanium or hafnium in combination with suitable organometal catalytic adjuvants to produce olefin products of increased value including solid products, for example, rubber, suitable for the manufacture of tires, wire coating, footwear and other industrial products.

It is an object of this invention to provide a method and a homogeneous catalyst system for the conversion of olefinic hydrocarbons. It is also an object of this invention to provide a homogeneous catalyst system comprising coordination complexes of zirconium, titanium or hafnium together with an aluminum-containing catalytic adjuvant for the olefin reaction. Still another object is to provide a method for converting olefins to other olefins of higher and lower number of carbon atoms. The provision of a homogeneous coordination catalyst system comprising zirconium, titanium or hafnium together with an aluminum-containing catalytic adjuvant for converting olefins to other olefins of higher and lower number of carbon atoms is yet another object of this invention. Other aspects, objects and advantages of the invention will be apparent to one skilled in the art upon study of the disclosure including the detailed description of the invention.

According to the process of this invention, cyclic and acyclic olefins, preferably internal non-tertiary olefins, and mixtures of these, including mixtures with ethylene, are converted to other olefins with a catalyst system which forms by the admixture, under reaction conditions, of catalyst components comprising:

a. IVB metal complex represented by the formula $[(L)_aM_bZ_c]_x$ wherein M is titanium, zirconium, or hafnium; each Z is a halogen or a CN, SCN, OCN, or $SnCl_3$ radical; each (L) is $R_3Q$, $R_3QO$, $R_2Q$—$QR_2$, O,

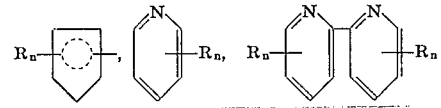

$[(RCO)_2CH-]$, $RNR^1{}_2$, $R_2N-R^2-NR_2$, $R^3S$, $R-S-R$, $(CHR^4{=}CR^4{=}CH_2-)$, $(R_2NCSS-)$, $R^5(COO-)_m$; or $R^5(CN)_m$; a is 1–4, b is 1–2; c is 0–6; m is 1–2; n is 0–4; and wherein the number of X and/or (L) groups present in the complex are not greater than the number required for the metal to achieve the closed shell electronic configuration of the next higher atomic number inert gas; x is a number, generally 1, indicative of the polymeric state of the complex; R is an aromatic or saturated aliphatic hydrocarbon radical, including alkoxy or halo substituted radicals, having up to 20 carbon atoms; $R^1$ is hydrogen or R; $R^2$ is a divalent aromatic or saturated aliphatic radical having up to 20 carbons atoms; $R^3$ is a saturated aliphatic or ethylenically unsaturated aliphatic hydrocarbon radical having four to 10 carbon atoms; $R^4$ is a hydrogen or a methyl radical; $R^5$ is an aromatic, saturated aliphatic, or ethylenically unsaturated aliphatic radical having up to 30 carbon atoms; and Q is phosphorous, antimony, or arsenic; with b. an aluminum-containing catalytic adjuvant selected from (1) a compound represented by the formula $R_eAlX_f$, or (2) a mixture (1) compounds, (3) a mixture of one or more $R_eAlX_f$ or $AlX_3$ compounds with one or more compounds represented by the formula $R_g^1M^1X_h$ or (4) an $AlX_3$ compound, wherein R is an aromatic, or saturated aliphatic hydrocarbon radical having up to 20 carbon atoms, including alkoxy and halo derivatives thereof, preferably an alkyl radical having up to 10 carbon atoms; $R^1$ is hydrogen or R; X is halogen; $M^1$ is a metal of Group IA, IIA, IIB or IIIA; e is an integer from 1 to 3; f is 0 or an integer from 1 to 2, the sum of e and f is 3; g is an integer from 1 to 3; and h is 0 or an integer from 1 to 2, the sum of g and h being equal to the valence of $M^1$; where acyclic olefins are converted and the adjuvant is (1), f is preferably 1 or 2.

The groups of metals as referred to herein are those of the Periodic Table of Elements of Handbook of Chemistry and Physics, Chemical Rubber Co., 45th Edition (1964).

Some examples of $R_eAlX_f$ or $AlX_3$ compounds are methylaluminum dichloride, dimethylaluminum fluoride, methylaluminum sesquichloride, ethylaluminum dichloride, aluminum trichloride, ethylaluminum sesquichloride, aluminum tribromide, di-(2-ethylhexyl)aluminum bromide, phenylaluminum dichloride, di(3-ethoxypropyl)aluminum bromide, benzylaluminum diiodide, dieicosylaluminum bromide, and the like, and mixtures thereof.

Some examples of the $R_g^1M^1X_h$ compounds are phenyllithium, methylsodium, t-butylpotassium, lithium hydride, benzylrubidium, lithium aluminum hydride, anthrylcesium, lithium borohydride, ethylberyllium hydride, diethylzinc, methylcadmium chloride, dipropylzinc, dicyclohexylmercury, triethylaluminum, trieicosylaluminum, methylgallium dibromide, di(12-chlorododecyl)aluminum chloride, triethylindium, triisopropylthallium, dimethylcalcium, dimethylstrontium, diethylbarium, and the like, and mixtures thereof.

The preferred (b) catalyst components are the (1) or (2) adjuvants.

Some specific examples of suitable titanium, zirconium, and hafnium complex (a) components are: (cyclopentadienyl)Ti(acetate)$_2$, (cyclopentadienyl)-Ti(propionate)$_2$, (cyclopentadienyl)TiBr$_{22}$, (2,4-pentanedionate)$_2$TiCl$_2$, (cyclopentadienyl)TiI$_2$, (2,4-pentanedionate)$_2$OTi, (pyridine)$_2$TiCl$_4$, (diethylamine)$_4$Ti, (diethyldithiocarbamate)$_{43}$TiCl$_3$, (cyclopentadienyl)Ti(acetate)$_3$, (2,2-bipyridine)$_3$Ti$_2$Cl$_6$, (acetonitrile)$_2$TiBr$_4$, (ethyl sulfide)$_2$TiBr$_4$, (tetrahydrothiophene)$_2$iBr$_4$, (tetraethyldiphosphine)TiBr$_4$, (triphenylarsine)$_2$TiCl$_4$, (benzylsulfide)$_2$TiCl$_4$, (triphenylphosphine)$_2$TiCl$_4$, (1,3-diphenyl-1,3-propanedionate)$_3$ZrCl,(1,2-cyclohexylenedinitrile)Zr(acetate)$_4$, (2,4-pentanedionate)$_2$ZrCl, ($\pi$-allyl)ZrCl$_2$, ($\pi$-allyl)$_4$Zr, (N,N-diethyl-p-phenylenediamine)$_2$ZrBr$_4$, (diphenylamine)$_2$ZrBr$_4$, (2-picoline)$_2$ZrBr$_4$, (dipropyldithiocarbamate)$_4$Zr, (dimethylamino)$_4$Zr, (cyclpentadienyl)$_2$ZrCl$_2$, (2,4-pentanedionate)$_2$OZr, (cyclopentadienyl)$_4$OZr$_2$Cl$_2$, (octylcyclopentadienyl)ZrF$_3$, (1,3-diphenyl-1,3-propanedionate)$_3$HfCl, (2,4-pentanedionate)$_3$HfCl, (2,4-pentanedionate)$_2$HfCl$_2$, (dimethylamine)$_4$Hf, and the like, and mixtures thereof.

Group IVB metal complex (a) components of the catalyst system can also be the reaction products formed by the admixture, under reaction conditions, of a IVB metal compound such as a halide, oxyhalide, or salt of an organic acid having up to about 30 carbon atoms per molecule or inorganic acid with a complexing agent selected from $R_3Q$, $R_3QO$, $R_2Q-QR_2$, $RCOCH_2COR$, $RNR^1_2$, $R_2N-R^2-NR_2$, R—S—R, 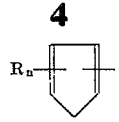 $R^5(CN)_m$,

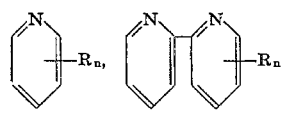

and compounds containing the radical (CHR$^4$ = CR$^4$—CH$_2$—), (R$_2$NCSS—), or R$^5$(COO—).

Some examples of starting IVB metal compounds which are suitable for complexing are: TiBr$_3$, TiBr$_4$, TiBr$_2$Cl$_2$, TiCl$_3$, TiCl$_3$, TiCl$_2$I$_2$, TiF$_3$, TiF$_4$, TiI$_3$, TiI$_4$, TiOI, TiOCl$_2$, TiOI$_2$, ZrBr$_4$, ZrCl, ZrCl$_2$, ZrCl$_3$, ZrCl$_4$, ZrOCl$_2$, ZrF$_4$, Zr(formate)$_4$, Zr(octanoate)$_4$, HfBr$_4$, HfCl$_4$, HfOCl$_2$, HfF$_4$, and Hf(SCN)$_4$.

Some examples of suitable complexing agents suitable for the preparation of the IVB metal complex (a) component are: trimethylphosphine, triethylarsine, tri-t-butylstibine, tri-n-butylphosphine, triisopropylarsine, tri-n-nonylstibine, tri-n-decylphosphine, tri-n-pentadecylarsine, tri(6,8-di-n-butyldecyl)stibine, tri-n-eicosylphosphine, diethyl-n-tridecylarsine, tri(3,5-dimethylcyclohexyl)stibine, methyldi-n-octylphosphine, tricyclopentylarsine, methyldicyclohexylstibine, tricyclohexylphosphine, tri(4-cyclohexylbutyl)arsine, tri(2,4,6-triethylphenyl)stibine, triphenylphosphine, diethylphenylarsine, methyldi(4-dodecylphenyl)stibine, tribenzylphosphine, tri(3,6-diphenyloctyl)-arsine, triphenylphosphine oxide, tetramethyldiphosphine, tetrabenzyldistibine, tripentylarsine oxide, sodium cyclopentadienylide and lithium 2-methylcyclopentadienylide.

Amines such as: trimethylamine, tri-tert-butylamine, tri-n-decylamine, trieicosylamine, tricyclohexylamine, triphenylamine, tribenzylamine, ethyldi-n-tridecylamine, diisopropyl-4-tolylamine, tri(6-phenylhexyl)amine, tri(3,5-di-n-heptylcyclohexyl)amine, triphenylamine, N,N,N',N'-tetramethylethylenediamine, pyridine, 4-vinylpyridine, 4-(2-ethylhexyl)pyridine and 2,2'-bipyridyl.

Other materials include: butyl sulfide, phenyl sulfide, thiophene, 2,5-diethylthiophene, allyl bromide, methallyl chloride, crotyl iodide, tetrallyl tin, tetrakis(2-methyl-2-butenyl)tin, tetramethallyl tin, acetylacetone, 2,4-heptanedione, 2-methylpyridine, benzoic acid, stearic acid, lauric acid, butyronitrile, acetonitrile, sodium diethyldithiocarbamate and potassium dimethyldithiocarbamate.

Still other complexing materials include cyclopentylamine, dibutylamine, methylamine, decylamine, 2-ethylhexylamine, distearylamine, aniline, 2,4,6-trimethylaniline, oxalic acid, malonic acid, 1,2-cyclohexylenedinitrile, ethylenedinitrile, methylmalonic acid, succinic acid, glutaric acid, and the like, and mixtures thereof.

The formula $[(L)_aM_bZ_c]_x$ is used herein to identify the product obtained by admixture of the titanium, zirconium or hafnium compound with at least one complexing agent. It should be understood, however, that the catalytic agent which has activity for the olefin reaction is the product resulting from the admixture of the metal compound and the complexing agent, and the aluminum-containing compound under catalyst-forming conditions whether or not the components are present as indicated by the formula.

The (a) component of the catalyst system is the product obtained by admixing a titanium, zirconium or hafnium compound, for example, a halide, oxyhalide, or salt of an inorganic acid or an organic acid having up to about 30 carbon atoms per molecule, with one or more ligand-forming compounds or complexing agents. In such a preparation, the molar proportion of Group IVb metal compound to the selected ligand-forming compound can vary widely but will usually be in the range of from about 0.1:1 to about 10:1, preferably from about 0.2:1 to 5:1. The products are obtained by combining the ingredients at any convenient temperature, however, excessively high temperatures at which some of the components might tend to decompose or excessively low temperatures at which some of the components might tend to crystallize or otherwise tend to become unreactive should be avoided. It will usually be satisfactory to combine these components at a temperature preferably in the range of from about 0° to about 130° C., more preferably about 20° to about 60° C., for a time in the range of from a few seconds up to about 24 hours, preferably in the presence of a diluent in which the components of the admixture are at least partially soluble. Any convenient diluent such as carbon tetrachloride, methylene chloride, benzene, xylene, cyclohexane, isooctane, chlorobenzene, and the like, can be used for this purpose. Any order of addition can be used. Such product need not be isolated but the mixture including the diluent can be used directly in the formation of the catalyst system.

The molar proportion of the (b) component to the (a) component, to form the catalyst system of the present invention, will generally be in the range of from about 0.1:1 to about 20:1, preferably in the range of about 1:1 to about 10:1.

The catalyst is prepared simply by combining the (a) component and the (b) component under conditions of time and temperature which permit the catalytically active product to be formed. This combination occurs very readily and, in general, the components can be mixed at any convenient temperature, however, excessively high temperatures at which some of the components tend to decompose, or excessively low temperatures at which some of the components tend to crystallize or otherwise become unreactive, should be avoided, In general, it is often preferred to operate at a temperature within the range of from about −80° to about 100° C. for a few seconds or for up to several hours in the presence of a diluent in which both the components are at least partially soluble. Any convenient diluent such as benzene, xylene, cyclohexane, isooctane, chlorobenzene, methylene chloride, ethylene chloride, and the like, can be used for this purpose. Halogenated diluents are generally preferred. The mixing of the two catalyst components is generally carried out in an inert atmosphere. After the catalytic mixture is formed, it need not be isolated but can be added directly to the olefin reaction zone as a solution in its preparation solvent. If desired, the catalyst components can be separately added, in any order, to the reaction zone either in the presence or absence of the feed olefin.

Olefins applicable for use in the process of the invention are non-tertiary, non-conjugated, acyclic mono- and polyenes having at least three carbon atoms per molecule including the cycloalkyl and aryl derivatives thereof; cyclic mono- and polyenes having at least four carbon atoms per molecule, including the alkyl and aryl derivatives thereof; mixtures of the above olefins; and mixtures of ethylene and the above olefins. Many useful reactions are accomplished with such acyclic olefins having three to 30 carbon atoms per molecule and with such cyclic olefins having four to 30 carbon atoms per molecule. Non-tertiary olefins are those wherein each carbon atom, which is attached to another carbon atom by means of a double bond, is also attached to a hydrogen atom. Internal olefins are preferred.

Some examples of acyclic olefins suitable for reactions of this invention include propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenylbutene-2, 4-octene, 3-eicosene, 3-hexene, 1,4-pentadiene, 1,4,7-dodecatriene, 4-methyl-4-octene, 4-vinylcyclohexene, 1,7-octadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl-1,4-octadiene, and 3-heptene, and the like, and mixtures thereof.

Some specific examples of cyclic olefins suitable for the reactions of this invention are cyclobutene, cyclopentene, cycloheptene, 3-methylcyclopentene, 4-ethylcyclohexene, 4-benzylcyclohexene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 6-methyl-6-ethylcyclooctadiene-1,4, and the like, and mixtures thereof.

It will be understood by those skilled in the art that not all olefinic materials will be converted by the present invention with equal effectiveness. The reactions described in the present invention are equilibrium-limited reactions and, barring the selective removal of one or more products from the reaction zone, the extent of conversion will depend upon the thermodynamics of the specific system observed. Thus, conversion of olefinic materials to give specific products can be thermodynamically favored while the reverse reaction is very slow and ineffective. For example, 1,7-octatriene is converted to equilibrium-favored products such as cyclohexene and ethylene. The reverse reaction of ethylene and cyclohexene, correspondingly, goes very poorly. Other well-known factors, such as steric hindrance in bulky molecules, significantly and sometimes drastically affect the rates of reaction of some olefins such that extremely long reaction times are required.

The reaction of symmetrical monoolefins with themselves, to give different olefin products, will sometimes proceed very slowly, requiring some double bond migration to take place before the reaction will proceed at a significant rate. For the same reason, the conversion of a mixture of ethylene and a 1-olefin for example can be more difficult than the conversion of ethylene with an internal olefin, some double bond isomerization also being required in this instance.

It has also been found that branching also retards the olefin reactivity in proportion to its propinquity to the reacting double bond. Analogously, the presence of inert polar substituents on the olefinic compound appears tolerable only if located some distance from the double bond.

Thus the present invention is directed primarily to the conversion of those olefins or combination of olefins which are capable of undergoing the olefin reaction to a significant degree when contacted with the catalyst of the present invention under reaction conditions suitable for effecting the olefin reaction.

Presently preferred olefinic feed compounds are those contained in the following classes:

1. Internal acyclic monoolefins, including those with aryl, cycloalkyl, or cycloalkenyl substituents, having four to 20 carbon atoms per molecule with no branching closer than about the 3- position and no quaternary carbon atoms or aromatic substitution closer than the 4- position to the double bond, and mixtures of such unsubstituted acyclic internal monoolefins. Some examples of these are: butene-2, pentene-2, hexene-3, octene-4, nonene-2, 4-methylpentene-2, decene-3, 8-ethyldecene-2, dodecene-4, eicosene-5, and the like.

2. Acyclic, nonconjugated polyenes having from seven to about 20 carbon atoms per molecule, containing from two to about four internal double bonds per molecule and having at least one double bond with no branching nearer than the 3-position and no quaternary carbon atom nearer than the 4-position to that double bond, or mixtures of such polyenes. Some examples are: 2,5-heptadiene, 2,6-octadiene, 4-methyloctadiene-2,6, 3,6,9-dodecatriene, and the like.

3. Cyclopentene.

4. Monocyclic and bicyclic monoolefins having seven to 12 ring carbon atoms, including those substituted with up to three alkyl groups having up to about five carbon atoms, with no branching closer than the 3- position and with no quaternary carbon atoms closer than the 4- position to the double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

5. A mixture of one or more of the monocyclic olefins of (4) with one or more unsubstituted acyclic internal monoolefins of (1). Some examples are: hexene-3 and cycloheptene, butene-2 and cyclooctene, butene-2 and cyclodecene, pentene-2 and cyclooctene, heptene-3 and cyclodecene, and the like.

6. Monocyclic and bicyclic polyenes having from five to about 12 ring carbon atoms, including those substituted with up to three alkyl groups having up to about five carbon atoms each, having at least one double bond with no branching closer than the 3-position and with no quaternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

7. A mixture of one or more monocyclic polyenes of (6) with one or more of the unsubstituted acyclic internal olefins of (1). Some examples of these are: 1,5-cyclooctadiene and butene-2, 1,5,9-cyclododecatriene and butene-2, 1,5,9-cyclododecatriene and pentene-2, and the like.

8. Polar group-substituted olefinic compounds of classes (1) through (7) containing from six to about 20 carbon atoms per molecule in which the polar group, such as a halogen atom, is sufficiently removed from the active double bond (generally no nearer to the double bond than the 5-position) so as not to interfere with the reaction, and mixtures with unsubstituted members of class (1). Some examples are: 7-chlorooctene-2, and the like.

According to the process of the invention, the olefin or mixture of olefins to be converted is contacted with the catalyst system at any convenient temperature below decomposition temperature and above freezing temperature of the components, generally within the range of from about −30° to about 150° C., preferably from about 0° to about 75° C., at any convenient pressure which is sufficient to maintain a liquid phase. When the catalyst component (a) of the specific catalyst system being utilized contains, or is prepared from, materials such as organic phosphines or pyridine compounds, conversion temperatures greater than about 30° C. are used. The conversion can be carried out in the presence of a diluent such as that used for the catalyst preparation, if it is desired. The time of contact will depend on the desired degree of conversion and the specific catalysts and olefins utilized, but will, generally, be in the range of from about 0.1 minute to about 24 hours, preferably 5–120 minutes. The proportion of catalyst composition to olefin feed in the reaction zone will generally be in the range of about 0.001–100 millimoles of Group IV metal for each mole of olefin in the reaction zone.

Any conventional contacting technique can be used for the olefin conversion, and batchwise or continuous operation can be utilized. After the reaction period, the products can be separated and/or isolated by any conventional means such as by fractionation, crystallization, adsorption, and the like. Unconverted feed material or products not in the desired molecular weight range can be recycled to the conversion zone. If desired, the catalyst can be destroyed by treatment with sufficient water or alcohol to deactivate the catalyst prior to the separation of products. Otherwise, after separation of the products, the catalyst can be recycled to the reaction zone.

The invention can be further illustrated by the following examples:

EXAMPLE I

Disproportionation of Pentene-2 Over (Cyclopentadienyl)TiCl$_3$/Methylaluminum Sesquichloride Into a dry 7-ounce pressure bottle was added 0.05 g of (cyclopentadienyl)TiCl$_3$ and 4 ml of chlorobenzene. The bottle was flushed with dry nitrogen and 5 ml of pentene-2 was added. To this yellow homogeneous solution was added 1 ml of a 1 molar solution of methylaluminum sesquichloride in chlorobenzene and the color solution changed to brown, to slightly yellow, and then to green. The reaction mixture was stirred at room temperature. After about 30 minutes, a sample was withdrawn, hydrolyzed by the addition of water, and analyzed showing the presence of butenes and hexenes. The reaction mixture was allowed to stand overnight and was again sampled and analyzed. The analysis showed 2.1 weight per cent butenes, 94.5 weight per cent pentenes, and 3.4 weight per cent hexenes. A small amount of higher boiling material was also found but was not considered in the above analysis.

EXAMPLE II

Disproportionation of Pentene-2 Over Zr(acetylacetone)$_4$/ Methylaluminum sesquichloride In a manner essentially identical to that of Example I, 5 ml of pentene-2 was contacted with the same catalyst system except that 0.05 g zirconium acetylacetonate was used in place of the titanium compound. After a 4-hour reaction period, butenes and hexenes were detected in the reaction mixture. After 72 hours, analysis showed about a 1 percent conversion of the pentene-2 to butenes and hexenes. A small amount of dimeric material was also detected.

EXAMPLE III

Disproportionation of Heptene-2 Over (Pyridine)$_2$TiCl$_4$/Ethylaluminum Dichloride In a manner similar to that of Example I, 0.1 g of TiCl$_4$(pyridine)$_2$ and 10 ml of chlorobenzene was cooled in an ice bath and treated with 0.2 ml of ethylaluminum dichloride. A red-brown somewhat heterogeneous mixture resulted. To this was added 5 ml of heptene-2. Analysis of the reaction mixture after 1 hour at 0° C. indicated the formation of new products. After another 4 hours at room temperature, analysis of the mixture showed the presence of butenes, decenes, and other olefin products.

EXAMPLE IV

Disproportionation of Heptene-2 Over (Cyclopentadienyl)$_2$TiCl$_2$/Methylaluminum Sesquichloride In a manner similar to that of Example I, 0.05 g of (cyclopentadienyl)$_2$TiCl$_2$ and 10 ml of dry chlorobenzene were cooled in an ice water bath and treated with 0.2 ml methylaluminum sesquichloride. To this solution was added 10 ml of heptene-2. After 2 hours at 0° C., the mixture was analyzed and disproportionation products were detected. The mixture was then warmed to 80° C. for 30 minutes and still greater quantities of disproportionation products, such as those produced in preceding examples, were observed.

In the practice of the process of this invention, the feed olefins, catalysts and operating conditions disclosed include combinations wherein solid, rubbery materials are produced; for example, if a propylene feed and a suitable aluminum-containing adjuvant such as an organo aluminum dihalide or an organo aluminum sesquihalide are used, a solid, rubbery material is produced having characteristics of ethylene-propylene rubber. The rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among impregnation solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the nonsupported homogeneous catalyst systems.

That which is claimed is:

1. A process for the conversion of olefins selected from the group consisting of non-tertiary acyclic internal olefins having at least four carbon atoms per molecule including alkyl and cycloalkyl derivatives thereof, non-tertiary non-conjugated acyclic polyenes having at least five carbon atoms per molecule including alkyl and cycloalkyl derivatives thereof, cyclic mono- and polyenes having at least four carbon atoms per molecule including alkyl and aryl derivatives thereof, mixtures of non-tertiary acyclic 1-olefins with the above olefins, mixtures of the above olefins, and mixtures of the above olefins with ethylene, said conversion being in accordance with the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond by contacting said olefins with a catalyst consisting essentially of a. a IVB complex represented by the formula $[(L)_aM_bZ_c]_x$ wherein M is titanium, zirconium, or hafnium, each Z is a halogen or a CN, SCN, OCN, or $SnCl_3$ radical; each (L) is $R_3Q$, $R_3QO$, $R_2Q$—$QR_2$, O,

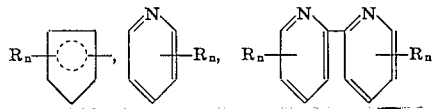

$[(RCO)_2CH-]$, $RNR^1{}_2$, $R_2N-R^2-NR_2$, $\overset{N}{R^3}\overset{N}{\underset{S}{\frown}}$, R-S-R, ($\underline{C}HR^4\!=\!\underline{C}R^4\!-\!CH_2-$), ($R_2NCSS-$), $R^5(COO-)_m$; or $R^5(CN)_m$; a is 1–4, b is 1–2, c is 0–6, m is 1–2; n is 0–4; and sufficient (L) and/or X groups present in the complex are not greater than the number required for the metal to achieve the closed shell electronic configuration of the next higher atomic number inert gas; x is a number indicative of the polymeric state of the complex; R is an aromatic or saturated aliphatic hydrocarbon radical, including alkoxy or halo substituted radicals, having up to 20 carbon atoms; $R^1$ is hydrogen or R; $R^2$ is a divalent aromatic or saturated aliphatic radical having up to 20 carbon atoms; $R^3$ is a saturated aliphatic or ethylenically unsaturated aliphatic hydrocarbon radical having four to 10 carbon atoms; $R^4$ is hydrogen or a methyl radical; $R^5$ is an aromatic, saturated aliphatic, or ethylenically unsaturated aliphatic radical having up to 30 carbon atoms; and Q is phosphorus, atimony, or arsenic; and b. an aluminum-containing adjuvant selected from
1. a compound represented by the formula $R_eAlX_f$,
2. a mixture of (1) compounds,
3. a mixture of one or more $R_eAlX_f$ or $AlX_3$ compounds with one or more compounds represented by the formula $R_g{}^1M^1X_h$, or
4. an $AlX_3$ compound, wherein R is an aromatic, or saturated aliphatic hydrocarbon radical having up to 20 carbon atoms, including alkoxy and halo derivatives thereof, preferably an alkyl radical having up to 10 carbon atoms; $R^1$ is hydrogen or R; X is halogen; $M^1$ is a metal of Group IA, IIA, IIB, or IIIA; e is an integer from 1 to 3; f is 0 or an integer from 1 to 2, the sum of e and f is 3; g is an integer from 1 to 3; and h is 0 or an integer from 1 to 2, the sum of g and h being equal to the valence of $M^1$.

2. The process of claim 1 wherein the (b) component is (1) or (2).

3. The process of claim 1 wherein said conversion is accomplished in the presence of a diluent in which both the (a) and (b) components are at least partially soluble.

4. The process of claim 3 wherein said diluent is benzene, xylene, cyclohexane, isooctane, chlorobenzene, methylene chloride or ethylene chloride.

5. The process of claim 1 wherein said catalyst is deposited on a solid inorganic or organic support or carrier selected from the group consisting of silica, alumina, silica-alumina, titania, boria, zeolites ion exchange resins, a solid polymer of 4-vinylpyridine and a solid polymer of vinyl dimethylphosphine.

6. The process of claim 1 wherein the (a) component is obtained by admixing a metal compound of titanium, zirconium or hafnium selected from the group consisting of a halide, an oxyhalide, a salt of an inorganic acid, a salt of an organic acid having up to about 30 carbon atoms per molecule with a ligand-forming compound capable of complexing with said metal compound in the molar proportion of the metal to the ligand-forming compound in the range of about 0.1:1 to about 10:1, at a temperature range of from about 0° to about 130° C., for a time in the range of a few seconds up to about 24 hours.

7. The process of claim 1 wherein the proportion of (b) component to the (a) component is in the range of from 0.1:1 to about 20:1 and the (a) and (b) components are combined at a temperature of from about −80° to about 100° C. for a few seconds up to several hours in an inert atmosphere, in the presence of a diluent in which both the components are at least partially soluble.

8. The process of claim 1 wherein said olefins are selected from the group consisting of
1. internal, acyclic monoolefins including those with aryl, cycloalkyl, or cycloalkenyl substituents, having four to about 20 carbon atoms per molecule with no branching closer to the double bond than the 3- position and no aromatic substitution or quaternary carbon atoms closer to the double bond than the 4- position and mixtures of such unsubstituted internal monoolefines;
2. polyenes having from seven to about 20 carbon atoms per molecule, containing from two to about four internal double bonds per molecule and having at least one double bond with no branching closer than the 3- position and no quaternary carbon atom closer than the 4- position to that double bond and mixtures of such polyenes;
3. cyclopentene;
4. cyclic and bicyclic monoolefins having seven to about 12 ring carbon atoms, including those substituted with up to three alkyl groups having up to about five carbon atoms, with no branching closer to the double bond than the 3- position and no quaternary carbon atoms closer to the double bond than the 4- position and mixtures of such olefins and mixtures of such olefins and cyclopentene;
5. a mixture of one or more of the monocyclic olefins of (4) with one or more unsubstituted, acyclic, internal monoolefins of (1);
6. cyclic and bicyclic polyenes having from five to about 12 ring carbon atoms, including those substituted with up to three alkyl groups having up to about five carbon atoms each, having at least one double bond with no branching closer to it than the 3- position and no quaternary carbon atoms closer to it than the 4- position and mixtures of such polyenes;
7. a mixture of one or more of the monocyclic polyenes of (6) with one or more of the unsubstituted acyclic internal olefins of (1); and
8. polar group-substituted olefinic compounds of (1) through (2) and (4) through (7) containing from six to about 20 carbon atoms per molecule in which the polar group is closer to the active double bond than the 5- position and mixtures of such polar group-substituted olefinic compounds with unsubstituted members of (1).

9. The process of claim 1 wherein the (a) component is (cyclopentadienyl)$TiCl_3$ and the (b) component is methylaluminum sesquichloride.

10. The process of claim 1 wherein the (a) component is Zr(acetylacetone)$_4$ and the (b) component is methylaluminum sesquichloride.

11. The process of claim 1 wherein the (a) component is (pyridine)$_2$-$TiCl_4$ and the (b) component is ethylaluminum chloride.

12. The process of claim 1 wherein the (a) component is (cyclopentadienyl)$_2$TiCl$_2$ and the (b) component is methylaluminum sesquichloride.

* * * * *